(12) United States Patent
Yu et al.

(10) Patent No.: US 7,446,700 B2
(45) Date of Patent: Nov. 4, 2008

(54) METHODS AND APPARATUS FOR DECREASING TIME TO FIRST FIX OF GPS RECEIVER

(75) Inventors: Xiaoguang Yu, Wuhan (CN); Haiquan Huang, Sichuan (CN)

(73) Assignee: O2Micro International Ltd., Georgetown (KY)

( * ) Notice: Subject to any disclaimer, the term of this patent is extended or adjusted under 35 U.S.C. 154(b) by 0 days.

(21) Appl. No.: 11/706,790

(22) Filed: Feb. 14, 2007

(65) Prior Publication Data

US 2008/0191939 A1    Aug. 14, 2008

(51) Int. Cl.
   *G01S 5/14*  (2006.01)
(52) U.S. Cl. .............................. 342/357.02; 342/357.15
(58) Field of Classification Search .............  342/357.15
   See application file for complete search history.

(56) References Cited

U.S. PATENT DOCUMENTS

| | | | |
|---|---|---|---|
| 5,373,531 A | | 12/1994 | Kawasaki |
| 5,615,236 A * | | 3/1997 | Turney ........................ 375/365 |
| 5,666,122 A * | | 9/1997 | Carter ..................... 342/357.15 |
| 6,392,593 B1 * | | 5/2002 | Pemble ................... 342/357.15 |
| 6,445,341 B2 * | | 9/2002 | Hasegawa ............... 342/357.13 |
| 7,053,824 B2 * | | 5/2006 | Abraham .................. 342/357.1 |
| 7,084,810 B2 * | | 8/2006 | Kitatani .................. 342/357.12 |
| 7,348,921 B2 * | | 3/2008 | Yu .......................... 342/357.15 |
| 2003/0128157 A1 * | | 7/2003 | Salkhi ..................... 342/357.06 |
| 2004/0012523 A1 * | | 1/2004 | Pietila et al. ............ 342/357.15 |
| 2005/0240345 A1 | | 10/2005 | Yamamoto |

* cited by examiner

*Primary Examiner*—Gregory C Issing
(74) *Attorney, Agent, or Firm*—Wang Law Firm, Inc.; Li Kan Wang

(57) ABSTRACT

The present invention provides a GPS receiver which is capable of computing a local time reference without employing a RTC circuitry and employing a nonvolatile storing unit to store backup navigation data, wherein the local time reference and the backup navigation data can be used to reduce the TTFF of the GPS receiver. The GPS receiver includes a nonvolatile storing unit and a positioning unit. The positioning unit is capable of retrieving the backup navigation data from the nonvolatile storing unit and computing a local time reference after said GPS receiver is powered up. The positioning unit is further capable of employing the backup navigation data and the local time reference to computing the position of the GPS.

13 Claims, 4 Drawing Sheets

METHODS AND APPARATUS FOR DECREASING TIME TO FIRST FIX OF GPS RECEIVER

FIELD OF THE INVENTION

The invention relates to GPS receivers, and in particular, to reduction of Time To First Fix (TTFF) in GPS receivers.

BACKGROUND OF THE INVENTION

The Global Positioning System (GPS) is a satellite based system developed by the United States Department of Defense to give positional information to a GPS receiver anywhere in the world. A properly equipped GPS receiver may therefore be used to provide positional information when position is desired. The GPS system is enabled by 24 or more satellites orbiting around the Earth at a period about 12 hours and a plurality of ground control stations. The aforementioned satellites make up a constellation and are arranged in six orbiting planes. Now, the orbiting planes are spaced sixty degrees apart and are inclined approximately fifty-five degrees from the equatorial plane. Such a kind of arrangement ensures that at any time and any location on the Earth, neglecting obstacles such as mountains and tall buildings, a GPS receiver could receive signals from 4 to 11 GPS satellites.

The data broadcasted by any GPS satellite is known as navigation message. The navigation message includes a plurality of information, such as ephemeris, almanac and a GPS satellite based time reference. Ephemeris herein refers to a set of data that indicates positions of GPS satellites. Almanac herein refers to a set of data that describes the orbits of the complete active fleet of GPS Satellites. The GPS satellite based time reference is a high accurate time reference generated by an atomic clock on each GPS satellite.

Normally, the navigation message is a narrow band binary phase shift keyed (BPSK) signal with a data rate of 50 bit per second. In order to enhance the performance of the GPS system, the navigation message of each GPS satellite needs to be spreaded over a wide band signal. Thus, the navigation message is first modulated with a high rate repetitive pseudorandom noise (PRN) code. Before transmission, the modulated navigation message needs to be further modulated with a high frequency carrier wave.

In order to determine the 3-dimensional (3D) position of a GPS receiver, the GPS receiver needs to obtain the positions and pseudoranges of at least four GPS satellites. Pseudorange herein refers to the distance between a GPS receiver and a GPS satellite. The position of a GPS satellite can be calculated from the ephemeris. And pseudorange can be calculated from time interval between the time when a GPS satellite transmits a GPS satellite signal and the time when the GPS satellite signal is received by a GPS receiver. Therefore, positions and pseudoranges can be calculated based on navigation messages. In order to obtain the navigation message, a GPS receiver needs to acquire and track GPS satellite signals.

In a GPS satellite signal acquisition phase, a GPS receiver first generates a local carrier and employs the local carrier to demodulate a GPS signal. However, the satellites are orbiting around the Earth at high speed and the GPS receiver may also be moving, therefore the carrier frequency of a GPS satellite signal may shift as a result of Doppler Effect. The carrier frequency shift of a GPS satellite signal caused by Doppler Effect is known as carrier Doppler frequency shift. Conventionally, it is reasonable to assume that the maximum carrier Doppler frequency shift is about ±10 kHz. Thus, the GPS receiver may need to acquire the carrier frequency of a GPS satellite signal in a range of ±10 kHz.

Still in the GPS satellite signal acquisition phase, the GPS receiver may also need to search for the PRN code phase of a GPS satellite signal and eliminate the PRN code phase error. The PRN code phase error herein refers to the code phase difference between the PRN code used by a GPS satellite and the PRN code generated by a GPS receiver. Besides the carrier Doppler frequency shift and PRN code phase error, the reference frequency provided by the local oscillator and the local time reference of a GPS receiver may not be accurate and may contain errors. The GPS receiver also needs to eliminate the reference frequency error and the local time reference error. In a GPS satellite signal tracking phase, all the aforementioned errors may be eliminated and the navigation message is obtained. Theoretically, a GPS receiver needs a minimum of about 18 seconds to calculate the position of the user. However, the signal of each GPS satellite does not reach the GPS receiver at the same time and GPS receiver needs time to acquire each GPS satellite. Therefore, conventionally, it takes 30 seconds to several minutes for a GPS receiver to finish GPS satellite signal acquisition and tracking and calculate the position of the user.

Many parameters are utilized to evaluate the performance of a GPS receiver. One of the parameters is the time delay from the time when a GPS receiver is powered up to the time when the GPS receiver determines current position for the GPS receiver. This parameter is known as the Time To First Fix (TTFF). Generally, GPS receivers with the shortest TTFF are preferred. The TTFF of a GPS receiver is affected by individual hardware and software design of the GPS receiver. As mentioned above, the TTFF of a conventional GPS receiver may range from 30 seconds to several minutes.

In order to reduce the TTFF of a GPS receiver, many solutions have been proposed. In one solution, there is provided a GPS receiver capable of storing backup navigation data in a memory when the GPS receiver is powered off, wherein the backup navigation data can be used to reduce the TTFF of the GPS receiver. Backup navigation data includes ephemeris, almanac and GPS satellite based time reference of each GPS satellite. Backup navigation data may also include other information such as, time mark, and the position of the user etc. Time mark indicates the time when the backup navigation data is generated.

When the GPS receiver is powered up again, the GPS receiver may use the ephemeris from the backup navigation data to determine the position and carrier Doppler frequency shift of any GPS satellite. The GPS receiver may also use the almanac to determine approximate positions of GPS satellites. When the approximate positions of GPS satellites are determined, the GPS receiver is capable of using the approximate positions of GPS satellites to estimate the carrier Doppler frequency shift of each GPS satellite. The GPS receiver may also employ the GPS satellite based time reference to synchronize the local time reference. When a GPS receiver gets the position of a GPS satellite or the carrier Doppler frequency shift of a GPS satellite signal, the GPS receiver does not need to acquire the carrier frequency of the GPS satellite in a wide range. Thus, the TTFF of the GPS receiver could be greatly reduced.

However, under the control of the aforementioned plurality of ground control stations, the ephemeris and the almanac change from time to time. The ephemeris is updated once every a few hours meanwhile the almanac is updated every a few days. Therefore, the GPS receiver may need to verify whether the backup navigation data stored in the memory is valid after powered up. Thus, in the aforementioned solution, there is also provided a real time clock (RTC) circuitry which is powered by a battery and capable of providing a local time reference while the GPS receiver is powered off. When the GPS receiver is powered up again, the local time reference provided by the RTC circuitry can be used to verify the backup navigation data.

FIG. 1 illustrates a prior art block diagram of a GPS receiver. The GPS receiver 106 employs a battery powered RAM to store the backup navigation data and a battery powered RTC circuitry to provide a local time reference. The GPS receiver 106 as illustrated in FIG. 1 is capable of using the backup navigation data and the local time reference to reduce the TTFF during determination of a position for the GPS receiver.

The GPS receiver 106 comprises a positioning unit 100 capable of processing GPS signals and calculating positions for the GPS receiver, a RAM 102 in communication with the positioning unit 100, a RTC circuitry 104 for providing a local time reference to the positioning unit, and a battery 108 for providing power to the RAM 102 and the RTC circuitry 104.

When the GPS receiver 106 is powered on, the positioning unit 100 continues to process incoming GPS signals, obtain the navigation message and the GPS satellite based time reference and calculate positions for the GPS receiver. Since the local time reference of the GPS receiver 106 contains an error, the positioning unit 100 needs to synchronize the local time reference to the GPS satellite based time reference. In order to reduce TTFF, the positioning unit 100 may also generate and store backup navigation data to the RAM 102 at predetermined time intervals. The RAM 102 is capable of storing the backup navigation data and preventing loss of the backup navigation data with a continuous power supply when the GPS receiver 106 is powered off.

When the GPS receiver 106 is powered off or the power delivered to the GPS receiver 106 is accidentally interrupted, the battery 108 provides power to the RAM 102 and RTC circuitry 104. Thus, when the power supply to the GPS receiver is interrupted, the battery 108 ensures that the backup navigation data stored in the RAM 102 is preserved and the RTC circuit 104 keeps operating.

When the GPS receiver 106 is powered up again, the positioning unit 100 reads out the backup navigation data stored in the RAM 102 and obtains the local time reference provided by the RTC circuitry 104. Although the local time reference provided by the RTC circuitry 104 contains an error, the local time reference can be employed to verify the backup navigation data stored in the RAM 102. To verify the backup navigation data, the positioning unit 100 needs to calculate the time interval between the local time reference and the time mark from the backup navigation data. If the time interval exceeds a predetermined period, the backup navigation data is regarded as invalid and the GPS receiver 106 begins to acquire a GPS satellite signal in a wide frequency range. As a result, the acquisition of 4 GPS satellite signals takes a lot time. When the backup navigation data is valid, the positioning unit 100 employs the backup navigation data to determine a position for the GPS receiver after the GPS receiver is powered on and avoids acquiring a GPS satellite signal in a wide frequency range. Consequently, the TTFF of the GPS receiver 106 is reduced.

In the aforementioned solution, in order to reduce the TTFF, both the RTC circuitry and the RAM are necessary and the power supply to the RTC circuitry and the RAM should not be interrupted. However, there are situations when the power of the battery 108 is exhausted or the battery 108 is disconnected either from the RAM 102 or from the RTC circuitry 104. Thus, after the GPS receiver is powered on again, the RTC circuitry 104 cannot provide the local time reference to the GPS receiver 106. Consequently, the backup navigation data cannot be used to determine the position of a GPS receiver for reducing TTFF purpose under the circumstance when battery runs out or removed for a period of time.

Therefore, it is needed a system that is capable of reducing the TTFF of a GPS receiver without using a RTC circuitry and immune to power loss, and it is to such system that the present invention is primarily directed.

SUMMARY OF THE INVENTION

The present invention advantageously provides a GPS receiver which is capable of computing a local time reference without employing a RTC circuitry and storing backup navigation data in a nonvolatile storing unit. As a result, the goal of reducing the TTFF of the GPS receiver without a RTC circuitry and immune to power loss can be achieved.

For one embodiment of this invention, there is provided a GPS receiver includes a nonvolatile storing unit and a positioning unit. The nonvolatile storing unit is capable of storing backup navigation data which can be used to reduce the TTFF of the GPS receiver. After the GPS receiver is powered up, the positioning unit is capable of computing a local time reference without using a RTC circuitry and retrieving the backup navigation data from the nonvolatile storing unit. The positioning unit is further capable of employing the local time reference and the backup navigation data to reduce the TTFF during determination a position for the GPS receiver.

In another embodiment of the invention there is also provided a method of employing backup navigation data to reduce the TTFF of a GPS receiver. The method includes the steps of: storing said backup navigation data in a nonvolatile storage unit, computing a local time reference for verifying the backup navigation data, retrieving said backup navigation data from the nonvolatile storage unit when the GPS receiver is powered up, and computing a position for the GPS receiver based on the local time reference and the backup navigation data.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 1:
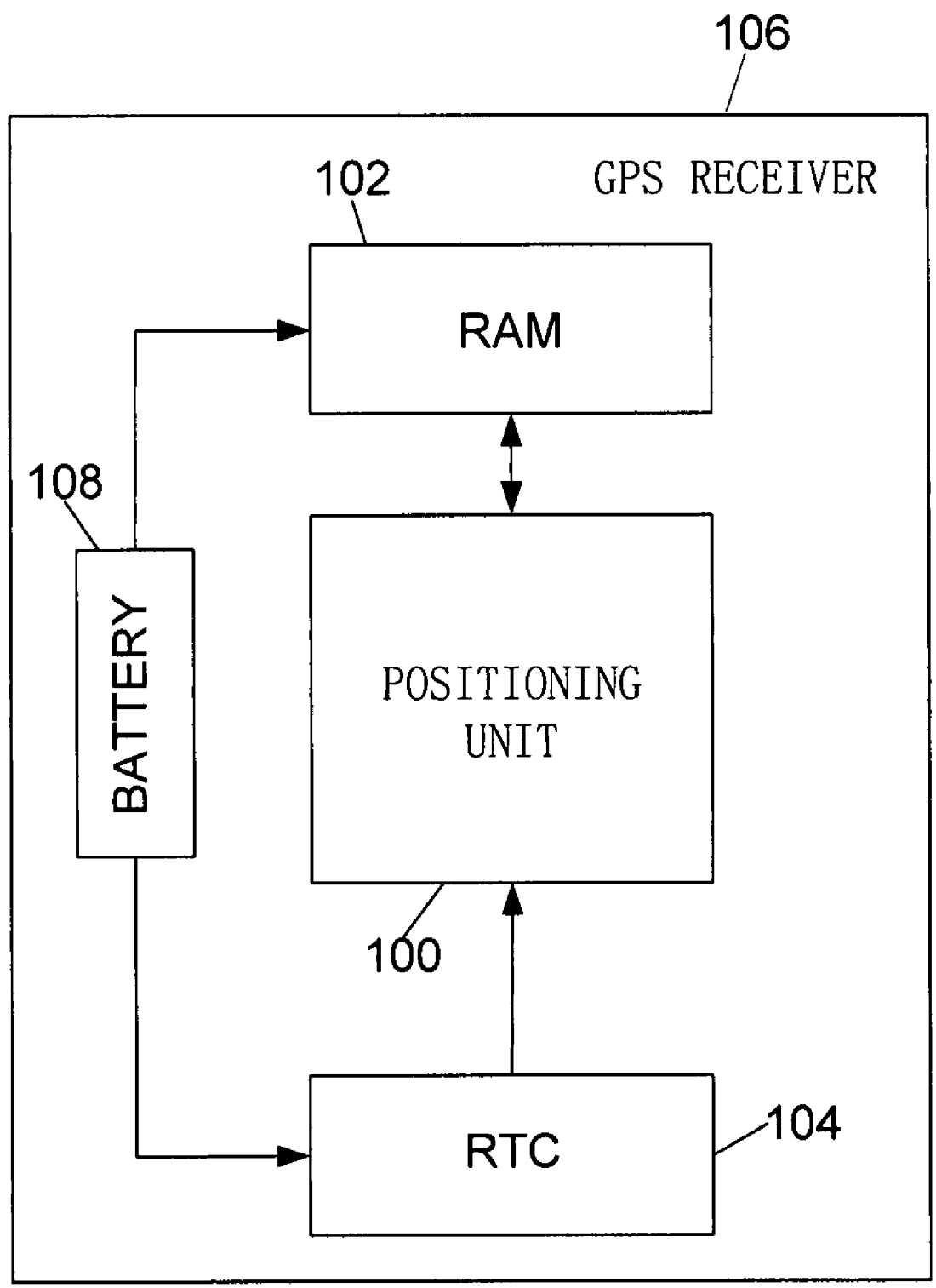
FIG. 1 illustrates a prior art block diagram of a GPS receiver.
Figure 2:
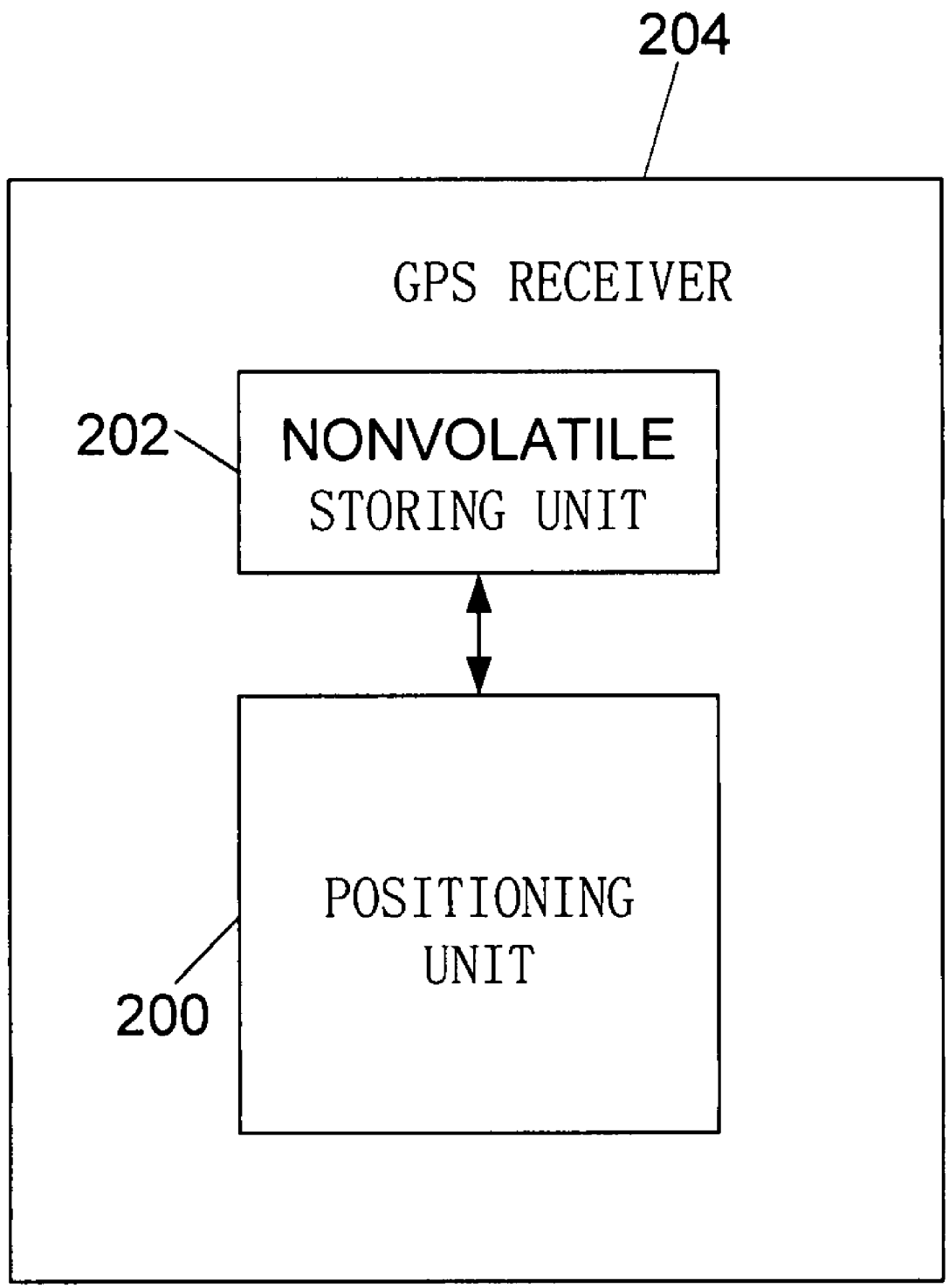
FIG. 2 illustrates an exemplary block diagram of a GPS receiver according to one embodiment of the present invention.

FIG. 2 illustrates an exemplary block diagram of a GPS receiver 204 employing a nonvolatile storage unit 202, preferably a Non-Volatile Memory (NVM), to store the backup navigation data and computing a local time reference without a RTC circuitry according to the present invention. The GPS receiver 204 illustrated in FIG. 2 includes a positioning unit 200 and a NVM 202. The positioning unit 200 is in communication with the NVM 202. The positioning unit 200 may include any variety of processors capable of acquiring and tracking GPS satellite signals, demodulating navigation message from the GPS satellite signals, and determining positions for the GPS receiver. The positioning unit 200 is capable of employing the backup navigation data to determine positions for the GPS receiver after the GPS receiver 204 is powered up. The positioning unit 200 is further capable of employing the backup navigation data and the local time reference to estimate carrier Doppler frequency shift of each visible GPS satellite. In addition, the positioning unit 200 is capable of estimating the frequency error of a local oscillator of the GPS receiver 204. The backup navigation data is stored in the NVM 202 that is capable of preserving the backup navigation data without power. The NVM 202 can be any variety of nonvolatile memory such as, Flash memory, Ferroelectric RAM (FRAM), or Magnetoresistive RAM (MRAM). The NVM 202 is erasable and programmable. Thus, the content of the NVM 202 can be erased and programmed by the positioning unit 200.

When the GPS receiver 204 is powered, the positioning unit 200 acquires and tracks GPS satellite signals. After the aforementioned processing, navigation messages are demodulated from these GPS signals. The positioning unit 200 extracts a GPS satellite based time reference from a navigation message and further employs it to synchronize the local time reference of the GPS receiver and to calculate the position of each GPS satellite and pseudoranges of at least 4 GPS satellites. The positioning unit 200 is also capable of retrieving backup navigation data. The backup navigation data retrieved from the positioning unit 200 is selectively stored in the NVM 202. In one embodiment, when the positioning unit 200 needs to store the retrieved backup navigation data into the NVM 202, the positioning unit 200 reads out the backup navigation data stored in the NVM and compares the backup navigation data stored in the NVM with the backup navigation data retrieved from the positioning unit 200. If the backup navigation data stored in the NVM is different from the backup navigation data retrieved from the positioning unit 200, the backup navigation data stored in the NVM 202 is erased and the backup navigation data retrieved from the positioning unit 200 is programmed into the NVM 202. In another embodiment, the positioning unit 200 directly erases the backup navigation data stored in the NVM and programs the backup navigation data retrieved from the positioning unit 200 to the NVM 202. Conventionally, a RAM requires a constant battery power supply to maintain the backup navigation data. If the power of the battery exhausts or the battery is disconnected from the RAM, the data stored in the RAM is then lost. Therefore, the backup navigation data is not available to decrease the TTFF of the GPS receiver. The present invention provides a NVM 202 to store backup navigation data. Thus, when the GPS receiver 204 is powered off, the NVM 202 still holds the backup navigation data. Therefore, the GPS receiver 204 is not affected by backup navigation data loss. When the GPS receiver 204 is powered on again, the positioning unit 200 reads out the backup navigation data from the NVM 202. When the backup navigation data is read out, the positioning unit 200 needs to get a local time reference to verify the backup navigation data. Since there is no RTC circuitry in the present embodiment, the positioning unit 200 cannot get the local time reference from a RTC circuitry. Instead, the positioning unit 200 computes the local time reference by performing a Time Coarse Synchronization. In the Time Coarse Synchronization, the positioning unit 200 computes the local time reference which is roughly synchronized to the GPS satellite based time reference. In order to perform the Time Coarse Synchronization, the positioning unit 200 first acquires and tracks a GPS satellite signal. And then a navigation message can be obtained by demodulating the GPS satellite signal and a GPS satellite based time reference can be obtained from the navigation message. After the above mentioned processing, the positioning unit 200 continues to perform the Time Coarse Synchronization based on the GPS satellite based time reference. Then the local time reference can be determined by adding a transmission delay to the GPS satellite based time reference. Herein, the transmission delay refers to the time interval between the time when a GPS satellite transmits the GPS signal and the time when a GPS receiver receives the GPS satellite signal. It is appreciated by those skilled in the art that the distance between a GPS receiver on the surface of the Earth and any GPS satellite visible to the GPS receiver may be within a range from 20192 kilometers to 25785 kilometers. Therefore, the transmission delay can be estimated. Usually, the transmission delay varies from 67.3 ms to 86 ms and the mean transmission delay is about 76 ms. Thus, the local time reference can be roughly determined by adding the mean transmission delay to the GPS satellite based time reference. As the mean transmission delay is not the actual transmission delay, therefore the local time reference is not precisely synchronized to the GPS satellite based time reference. Generally, there is an error between the GPS based time reference and the local time reference and the error is within a range of ±10 ms. Usually, the Time Coarse Synchronization can be fulfilled within several milliseconds.

After Time Coarse Synchronization, the positioning unit 200 uses the local time reference to verify the backup navigation data obtained from the NVM 202. To verify the backup navigation data, the positioning unit 200 needs to calculate the time interval between the local time reference and the time mark from the backup navigation data. As mentioned above, if the time interval does not exceed a predetermined time period, the backup navigation data is regarded as valid and can be further employed to reduce the TTFF of the GPS receiver. Otherwise, the backup navigation data is invalid. If the backup is invalid, the positioning unit 200 discards the backup navigation data and starts to acquire GPS signals in a wide frequency range.

If the ephemeris is valid, the positioning unit 200 may directly calculate the position of each GPS satellite from the ephemeris. Then, the positioning unit 200 estimates carrier Doppler frequency of each visible GPS satellite and the frequency error of the local oscillator. Based on the estimated carrier Doppler frequency shift of each visible GPS satellite, the positioning unit 200 may be able to acquire GPS signal in a narrow frequency range. Consequently, the TTFF of the GPS receiver 204 can be reduced.

If the ephemeris is not valid, the positioning unit 200 cannot directly calculate the position of each GPS satellite. However, when the almanac is valid, based on the almanac, the local time reference, and visible satellites, the approximate carrier Doppler frequency shifts and approximate positions of visible GPS satellites may be estimated. The positioning unit 200 may also acquire GPS satellite signal in a narrow frequency range. Advantageously, the GPS receiver does not need to obtain the local time reference from a RTC circuitry, and with the usage of NVM the backup navigation data stored in the NVM will not be lost when the power supply or battery is removed. Consequently, the GPS receiver does not need to acquire the GPS satellite signal to obtain the positioning information all over again, instead, GPS receiver can use the backup navigation data contained in the backup navigation data after the GPS receiver powered up again.

Figure 3:
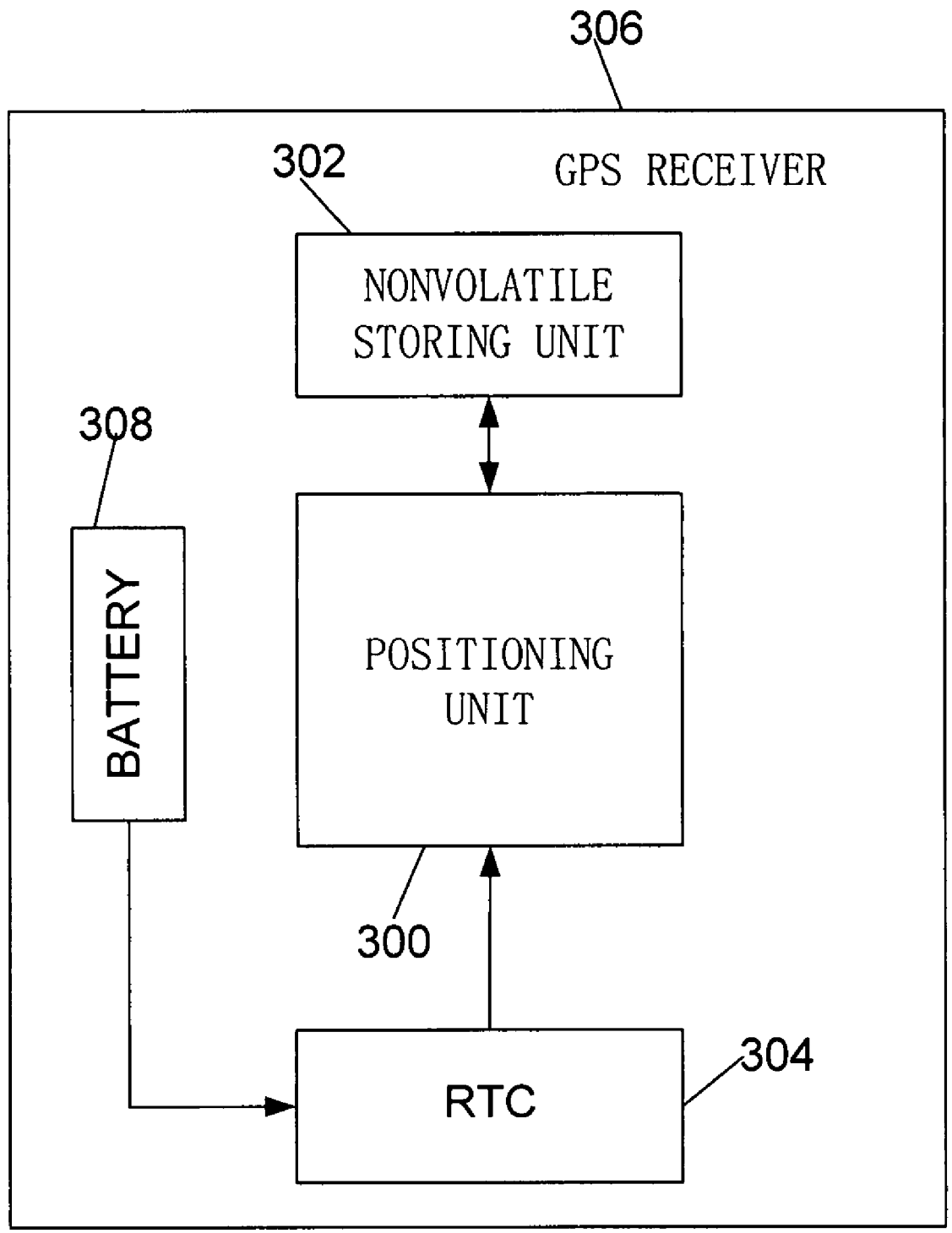
FIG. 3 illustrates an exemplary block diagram of a GPS receiver according to another embodiment of the present invention.

FIG. 3 illustrates an exemplary block of another embodiment of the present invention with an optional RTC circuitry. In FIG. 3, a GPS receiver 306 is displayed. The GPS receiver 306 is based on the GPS receiver 204 of FIG. 2. The GPS receiver 306 not only has a positioning unit 300 and a NVM 302 in communication with the positioning unit 300 but also has a battery powered RTC circuitry 304 for providing a local time reference to the positioning unit 300 and a battery 308. The battery 308 is used to supply power to the RTC circuitry 304 when the GPS receiver 306 is powered off. The battery 308 may be any variety of batteries, such as lithium-ion, nickel-cadmium, nickel-metal hydride batteries, or the like.

After the GPS receiver 306 is powered up, the positioning unit 300 detects whether the local time reference can be obtained from the RTC circuitry 304. If the local time reference can be obtained from the RTC circuitry 304, the GPS receiver avoids Time Coarse Synchronization. If the local time reference cannot be obtained from the RTC circuitry 304, the positioning unit 300 turns to compute the local time reference by performing a Time Coarse Synchronization. Advantageously, in this embodiment the TTFF of the GPS receiver 306 is not affected regardless of the presence of the RTC circuitry.

Figure 4:
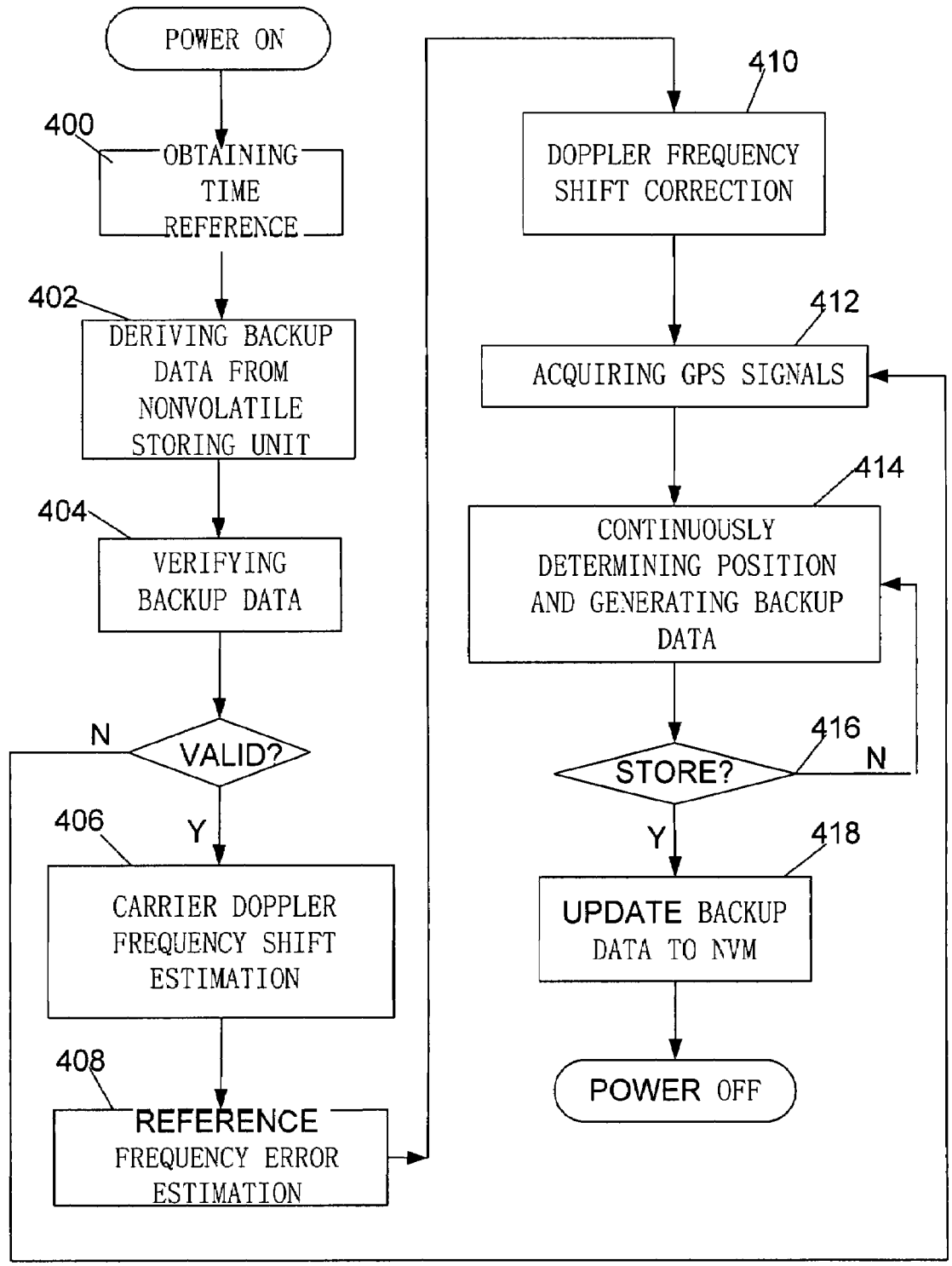
FIG. 4 illustrates an exemplary flowchart for the operations of a GPS receiver according to one embodiment of the present invention.

FIG. 4 illustrates an exemplary flow chart of employing backup navigation data to reduce the TTFF of a GPS receiver. After a GPS receiver is powered up, the GPS receiver first acquires and tracks a GPS satellite signal and obtains the GPS satellite based time reference from the GPS satellite signal and then the GPS receiver performs a Time Coarse Synchronization based on the GPS satellite based time reference and obtain the local time reference, step 400. Alternatively, after the GPS receiver is powered up, the GPS may first try to obtain the local time reference from a RTC circuitry. If the time reference cannot be obtained from the RTC circuitry, the GPS receiver continues to perform a Time Coarse Synchronization based on a GPS signal and obtain the local time reference. Then, the GPS receiver continues to obtain the backup navigation data stored in a nonvolatile storing unit, step 402. Once the local time reference and the backup navigation data are obtained, the GPS receiver begins to use the local time reference to verify the backup navigation data, step 404. In order to verify the backup navigation data, the GPS receiver first calculates the time interval between the time mark from the backup navigation data and the local time reference. If the time interval exceeds a predetermined period, then the backup navigation data is invalid and cannot be used to reduce the TTFF of the GPS receiver. Then the GPS receiver discards the backup navigation data and starts to acquire GPS satellite signals in a wide frequency range. If the time interval is within the predetermined time period, then the backup navigation data is valid. And the GPS receiver continues to utilize the backup navigation data to estimate the carrier Doppler frequency shift of each visible GPS satellite, step 406. Then the GPS receiver continues to estimate the reference frequency error of the local oscillator of the GPS receiver, step 408. After the above steps, the GPS receiver corrects the frequency difference between the local carrier and carrier frequencies of GPS satellite signals, step 410. Then, the GPS receiver acquires and tracks GPS satellite signals, step 412. The GPS receiver also generates backup navigation data while continuously determining positions for the GPS receiver, step 414. When a set of backup navigation data has been generated, the GPS receiver queries whether the generated backup navigation data needs to be programmed into the nonvolatile storing unit or not, step 416. When the generated backup navigation data is different from the backup navigation data stored in the nonvolatile storing unit, the GPS receiver programmed the generated backup navigation data into the nonvolatile storing unit, step 418. Otherwise, the generated backup navigation data is discarded and the GPS receiver repeats the step 412 and 414.

In the context of FIG. 4, the steps illustrated do not require or imply any particular order of actions. The actions may be executed in sequence or in parallel. The method may be implemented, for example, by operating portion(s) of a network server or user device to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A GPS receiver for employing backup navigation data to reduce the Time To First Fix (TTFF) when determining the position of the GPS receiver, comprising:
 a nonvolatile storing unit for storing said backup navigation data; and
 a positioning unit in communication with said nonvolatile storing unit, said positioning unit being capable of retrieving said backup navigation data from said nonvolatile storing unit and computing a local time reference by adding a transmission delay to a current GPS satellite based time reference without using an RTC circuit when said GPS receiver is powered on, said positioning unit being further capable of employing said backup navigation data and said local time reference to reduce the TTFF during determination of a position for said GPS receiver.

2. The GPS receiver of claim 1, wherein said positioning unit is capable of computing said local time reference by synchronizing to said GPS satellite based time reference obtained from navigation messages from multiple GPS satellites.

3. The GPS receiver of claim 2, wherein, after said GPS receiver is powered on, said positioning unit is capable of employing said local time reference to verify if said backup navigation data is valid.

4. The GPS receiver of claim 3, wherein, when said backup navigation data is valid, said positioning unit is further capable of employing said backup navigation data to determine the position of said GPS receiver.

5. The GPS receiver of claim 4, wherein said positioning is further capable of employing said backup navigation data and said local time reference to estimate a carrier Doppler Frequency Shift of each GPS satellite.

6. The GPS receiver of claim 4, wherein said positioning unit is further capable of estimating a reference frequency error of said GPS receiver.

7. The GPS receiver of claim 6, wherein said positioning unit is capable of employing said carrier Doppler Frequency Shift and said reference frequency error of said GPS receiver to acquire GPS signals.

8. A method for employing backup navigation data to reduce the Time To First Fix (TTFF) of a GPS receiver, comprising the steps of:

storing said backup navigation data in a nonvolatile storage unit;

computing a local time reference by adding a transmission delay to a current GPS satellite based time reference without an RTC circuit for verifying if said backup navigation data is valid when said GPS receiver is powered on;

retrieving said backup navigation data from said nonvolatile storage unit; and computing a position for the GPS receiver based on said local time reference and said backup navigation data.

9. The method of claim 8, wherein the step of obtaining a local time comprising:

acquiring a GPS satellite signal after said GPS receiver is powered on;

tracking said GPS satellite signal;

obtaining a GPS satellite based time reference from said GPS satellite signal; and computing said local time reference based on said GPS satellite based time reference.

10. The method of claim 8, further comprising the step of:

estimating a carrier Doppler frequency shift of each GPS satellite based upon the backup navigation data when said backup navigation data is valid.

11. The method of claim 8, further comprising the step of:

estimating a reference frequency error of said GPS receiver.

12. The method of claim 11, further comprising the step of:

acquiring GPS signals by employing said carrier Doppler Frequency Shift and said reference frequency error of said GPS receiver.

13. The method of claim 10, further comprising the steps of:

generating said backup navigation data; and storing said backup navigation data to said nonvolatile storage unit.

* * * * *